US010515026B2

(12) United States Patent
Piel et al.

(10) Patent No.: US 10,515,026 B2
(45) Date of Patent: *Dec. 24, 2019

(54) SYSTEM AND METHOD FOR REMOTE SET-UP AND ADJUSTMENT OF PERIPHERALS

(71) Applicant: Ademco Inc., Golden Valley, MN (US)

(72) Inventors: Kevin G. Piel, Ronkonkoma, NY (US); Kenneth G. Eskildsen, Great Neck, NY (US)

(73) Assignee: ADEMCO INC., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,585

(22) Filed: Dec. 10, 2018

(65) Prior Publication Data
US 2019/0114269 A1 Apr. 18, 2019

Related U.S. Application Data

(62) Division of application No. 14/658,342, filed on Mar. 16, 2015, now Pat. No. 10,152,431.

(51) Int. Cl.
G06F 13/00 (2006.01)
G06F 13/10 (2006.01)
H04L 12/28 (2006.01)
G06F 3/038 (2013.01)
G06F 3/0484 (2013.01)
G06F 3/00 (2006.01)

(52) U.S. Cl.
CPC ............ G06F 13/102 (2013.01); G06F 3/038 (2013.01); G06F 3/04847 (2013.01); H04L 12/2816 (2013.01); G06F 2203/0383 (2013.01)

(58) Field of Classification Search
CPC .......... G06F 13/102; G06F 13/00; G06F 3/00
USPC .................................................. 710/8, 10, 14
See application file for complete search history.

(56) References Cited

U.S. PATENT DOCUMENTS

| 9,640,005 | B2 | 5/2017 | Geerlings et al. | |
| 10,142,421 | B2* | 11/2018 | Mighdoll | ........... G05D 23/1902 |
| 2006/0125621 | A1 | 6/2006 | Babich | |
| 2008/0151795 | A1 | 6/2008 | Shorty et al. | |
| 2012/0203379 | A1* | 8/2012 | Sloo | .................... G05D 23/1902 700/276 |
| 2013/0173064 | A1* | 7/2013 | Fadell | ................. G05D 23/1902 700/276 |
| 2013/0204440 | A1* | 8/2013 | Fadell | ...................... F24F 11/30 700/276 |
| 2013/0338839 | A1* | 12/2013 | Rogers | ............... G05D 23/1904 700/278 |
| 2014/0266669 | A1 | 9/2014 | Fadell et al. | |

(Continued)

OTHER PUBLICATIONS

Extended European Search Report, dated Jun. 20, 2015, for European Patent Application No. EP 16 15 8849.

Primary Examiner — Christopher B Shin
(74) Attorney, Agent, or Firm — Husch Blackwell LLP

(57) ABSTRACT

A system and process of adjusting units coupled to a control element which includes, installing the unit at a selected location. A parameter can be entered from a displaced user operable device. The unit can be directed to carry out a selected function. Performance can be evaluated whether an additional parameter alteration is required based on a predetermined criterion.

5 Claims, 2 Drawing Sheets

(56) References Cited

U.S. PATENT DOCUMENTS

| | | | |
|---|---|---|---|
| 2014/0316581 A1* | 10/2014 | Fadell | G05D 23/1904 700/276 |
| 2015/0228139 A1* | 8/2015 | Geerlings | G08C 17/02 340/5.61 |
| 2015/0339031 A1* | 11/2015 | Zeinstra | B60K 37/06 715/747 |
| 2016/0179087 A1* | 6/2016 | Lee | G01C 21/3664 700/9 |
| 2016/0275022 A1 | 9/2016 | Piel et al. | |

* cited by examiner

SYSTEM AND METHOD FOR REMOTE SET-UP AND ADJUSTMENT OF PERIPHERALS

CROSS-REFERENCE TO RELATED APPLICATIONS

This application is a divisional of and claims the benefit of the filing date of U.S. application Ser. No. 14/658,342 filed Mar. 16, 2015.

FIELD

The application pertains to systems and methods of adjusting devices being installed in a computer based communications system. More particularly, the application pertains to such systems and methods which enable an installer to specify, or alter, parameter values of units from a distance.

BACKGROUND

During installation of monitoring, or security, systems various peripherals such as detectors, or input/output devices can sometimes require multiple setting adjustments in order to perform their respective functions properly. This can add time and steps to every installation by causing the installer to have to climb a ladder, open the device, make adjustments, close the unit and then re-test the settings (in some cases multiple times).

DETAILED DESCRIPTION

Figure 1:
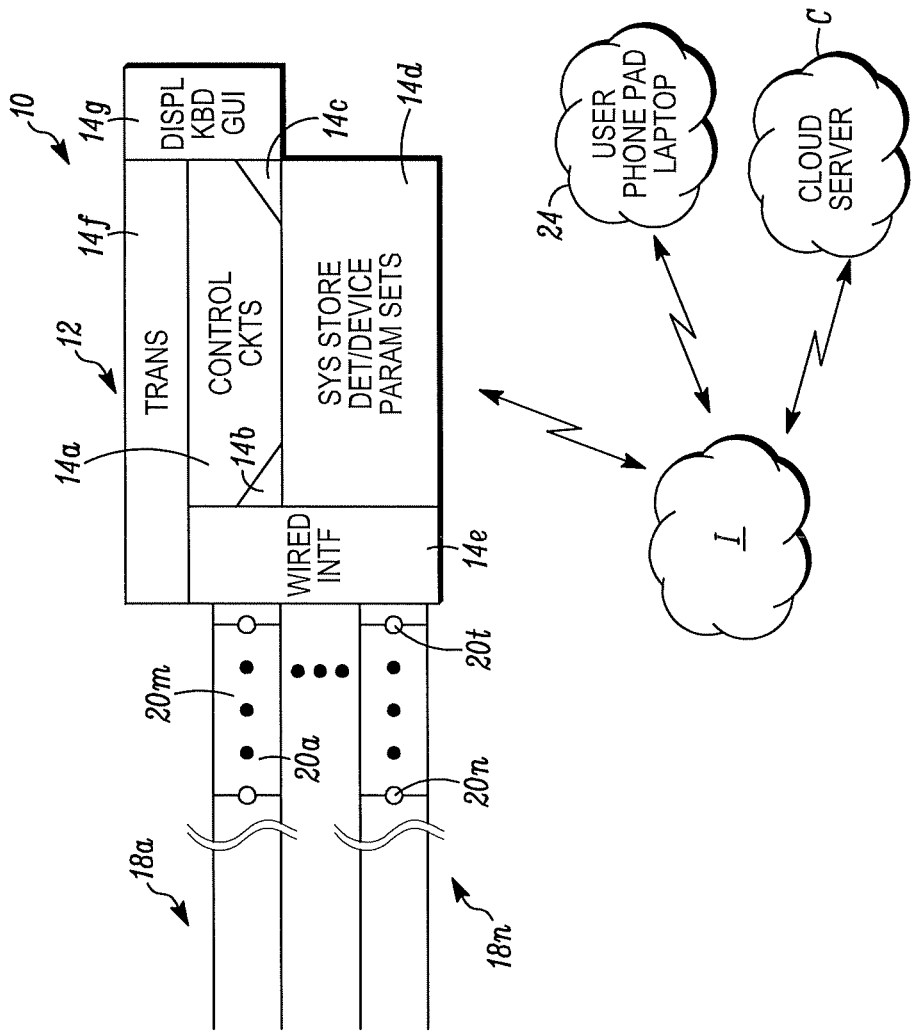
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect the settings of devices or units can be adjusted via a local user interface, such as a system keypad, or remotely via a smartphone app or via a computer network, such as ValueNet or other networks. As a result, the effort in carrying out multiple adjustment steps can minimized thereby saving installation, or, maintenance time and ultimately reducing customer expenses.

In another aspect, a method in accordance herewith can include setting up a control element. A device or unit to be installed is "paired" with the control element. It can then be physically installed as required. The device can then be tested using its default parameter settings.

If the settings need to be adjusted, the installer can do so from a remote controller. For example, the control element might include a keypad, or graphical user interface. Alternately, a smartphone, or other type of communications device can be used to adjust the settings via a computer network, such as the Internet. The device can be tested again without requiring the installer to physically contact the device, a second time, after installation, to adjust the settings.

Where a displaced communications device is being used to adjust the settings, the device can illuminate an indicator confirming that its settings are being revised, or changed. Alternately, an audible output can be emitted by the device.

If desired, remote settings can be stored with a cloud service. They can be synced with the unit or device via a GSM/CDMA cellular-type radio or via a computer network, such as the Internet, either in a hardwired, or wireless implementation. Such communications can also be encrypted for security.

FIG. 1 illustrates an embodiment hereof, a system 10 which provides a monitoring function for a region R. Other than as discussed herein, the exact type of monitoring that is being carried out relative to the region R is not a limitation hereof.

System 10 includes a control element, or control panel, 12. Control element 12 includes control circuits 14a, which might be implemented, at least in part with one or more programmable processors 14b along with executable control circuitry 14c.

A system storage unit 14d, used to store detector, or device parameter sets, 14d is coupled to and readable by the control circuits 14a. Element 12 can also include zone input/output interfaces 14e for communicating with one or more hardwired loops 18a, 18b . . . 18n. Element 12 can also include one or more transceivers 14f for communicating with wireless devices, or computer networks, such as internet I as discussed below.

Pluralities of detectors or other units 20a . . . 20n can be coupled to loops 18a . . . 18n as would be understood by those of skill in the art. Members of the pluralities 20a . . . 20n can include without limitation ambient condition security detectors such as glass break detectors, intrusion detectors, position detectors all without limitation. Such pluralities can also include smoke, fire, gas, thermal or other ambient condition detectors without limitation.

A plurality of wireless detectors, indicator units or actuators 22 can be in wireless communication with the transceiver 14f. It will be understood that the units 20 and units 22 either are or would be installed throughout the region R to provide monitoring, warning or control functions.

The control element 12 can also include a user interface 14g. Interface 14g can be in hardwired or wireless communication with control element 12. It can be implemented with a displaced, keyboard or graphical user interface without limitation.

System 10 can be internet enabled and can communicate via network I with a displaced cloud server C along with a user device 24, such as a cellular-type phone, pad or laptop.

Figure 2:
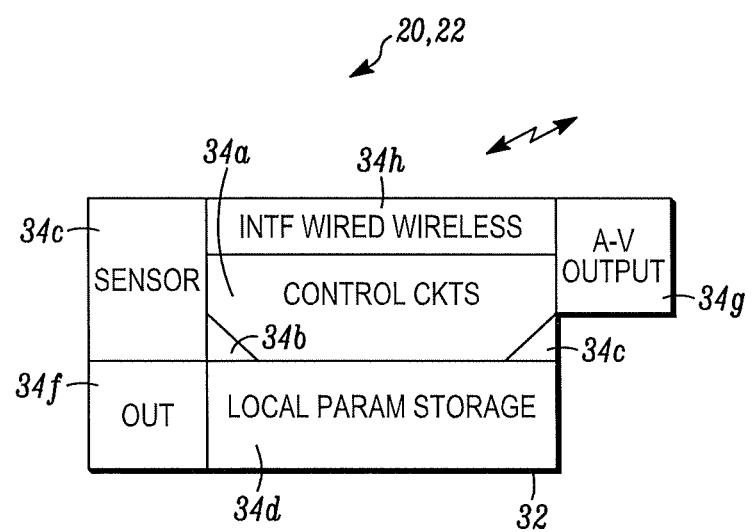
FIG. 2 is a block diagram of a device usable with the system of FIG. 1.

FIG. 2 a block diagram of members of the pluralities 20, 22, includes a housing 32. Housing 32 can carry control circuits 34a implemented at least in part by one or more programmable processors 34b along with executable control software 34c. Parameters values for the unit of FIG. 2 can be stored in local parameter storage unit 34d, a read-write storage unit. Members of the pluralities 20, 22 can include some or all of local condition sensors 34e as well as output circuitry 34f.

Audio or visual output devices can also be carried by housing 32 and coupled to control circuits 34a.

In summary, where members of the pluralities 20, 22 are to be installed or adjusted, such activities can be facilitated as described herein. For example, the respective unit can be initially installed with default parameter settings or parameter values in the storage unit 34d of each. Performance of the unit can be evaluated by sending test commands to the element 12 which can in turn communicate with the detectors or units 20*i*, or 22*j*.

If performance of the respective detectors or units such as 20*i*, or 22*j* needs to be adjusted, the installer can do so from a remote control element, such as element 12. For example, as noted above the control element 12 might include one or more of a keypad, or graphical user interface 14*g*. Alternately, a smartphone, or other type of communications device 24 can be used to adjust the settings via a computer network, such as the Internet I. It will be understood that the units 20, 22 can be adjusted via local control circuitry, or can be adjusted via software that implements processes and/or adjusts thresholds. The device can be tested again without requiring the installer to physically contact the device, a second time, after installation, to adjust the parameter values, or, settings of the respective unit.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
  a storage unit of a common control element storing unit parameter sets;
  pairing the common control element with a first unit, the first unit including local control circuitry that implements an adjustable setting that, when adjusted, alters a performance of the first unit;
  the common control element receiving test commands from a portable user device in wireless communication with the common control element;
  responsive to receiving the test commands, the common control element identifying a first value from the unit parameter sets and directing the first unit to carry out a function using the first value for the adjustable setting;
  responsive to first results of the first unit carrying out the function, the common control element receiving an instruction from the portable user device; and
  responsive to receiving the instruction, the common control element identifying a second value from the unit parameter sets and directing the first unit to adjust the adjustable setting to the second value when carrying out the function.

2. The method as in claim 1 further comprising:
  installing a default value of the adjustable setting in the first unit prior to installation.

3. The method as in claim 1 wherein the portable user device includes at least one of a keypad, an audible input device, a graphical user interface, a cellular-type user communications device, or an internet enabled user communications device.

4. The method as in claim 1 further comprising:
  pairing the common control element with the first unit before the common control element directs the first unit to carry out the function.

5. The method as in claim 1 further comprising:
  an indicator of the first unit outputting a signal indicative of adjusting the adjustable setting.

* * * * *